July 17, 1951  S. C. RETHORST  2,561,291
ROADABLE AIRCRAFT

Filed June 26, 1947  2 Sheets-Sheet 1

INVENTOR
Scott C. Rethorst

July 17, 1951   S. C. RETHORST   2,561,291
ROADABLE AIRCRAFT
Filed June 26, 1947   2 Sheets-Sheet 2

INVENTOR.
Scott C. Rethorst

Patented July 17, 1951

2,561,291

UNITED STATES PATENT OFFICE 2,561,291

ROADABLE AIRCRAFT

Scott C. Rethorst, Washington, D. C.

Application June 26, 1947, Serial No. 757,121

7 Claims. (Cl. 244—50)

This invention relates to a novel type of aircraft whose dimensions allow travel on the ground over public highways.

More particularly the invention relates to an aircraft of the flying wing type, having a very low aspect ratio, with engine driven propellers so disposed that the entire aircraft is immersed in the propeller slipstream.

In the past numerous efforts have been made to devise a practical roadable aircraft capable both of flight as well as ground travel on public highways. However, conventional aircraft usually have a wing spread or span several times the practical and legal requirement of a maximum width of eight feet for travel on highways in the United States. As a result, efforts to design conventional aircraft for highway use have resorted to the use of folding, movable, or removable wings, or in the case of Autogiros and helicopters, to the use of folding rotor blades. The disadvantages of these roadable aircraft, such as complicated controls, excessive vibrations, and aerodynamic inefficiency are well known in the art.

Likewise, previous efforts to construct roadable aircraft having primary lifting or sustaining airfoils with a spoon of only eight feet have been generally unsuccessful due chiefly to excessive induced drag inherent in low aspect ratio airfoils. This limiting effect is a natural result of low aspect ratio at slow air speeds as will be readily apparent from a brief appraisal of the well known circulation and lifting line theories that have been worked along the lines suggested by the German aerodynamicist Prandtl as early as 1904.

My invention provides a new and novel aircraft which avoids both the cumbersome disadvantages of a large span and the limiting efficiencies of a short span. Its basis of operation rests on the following principles:

Induced drag becomes progressively less at high air speeds, and for this condition factors affecting induced drag, among them the aspect ratio, become less critical. Hence, low aspect ratio may be used without a too severe penalty on performance at high speed, but at low speeds, take off and climbing, which are prerequisite to high speed, induced drag with low aspect ratio is so great as to make operation practically impossible. A detailed discussion of these factors can be found in any book on airplane design and is outlined, for example, by E. P. Warner, Airplane Design-Performance, page 231.

However, when an object is immersed in a stream of high velocity air, the relative motion of the air by the object produces a force on the object. This force for convenience in aerodynamic computations is resolved into components parallel and perpendicular to the direction of the air stream and called drag and lift respectively. The propeller slipstream, being a stream of high velocity air, exerts such an aerodynamic force on objects immersed within it. With conventional aircraft, such as single engine tractor airplanes, the slipstream is generally large as compared to the fuselage, which is usually immersed in the stream. The resultant aerodynamic force, which in the case of a conventional fuselage, has only a drag component, is then a function of slipstream velocity. Computing the aerodynamic force on this basis is common practice and is outlined in Warner's Airplane Design-Performance, page 515.

With conventional multiengine aircraft, usually a section of the wing is immersed in the slipstream. Again the aerodynamic force on the portion of the wing so immersed will be a function of slipstream velocity; and here, since the wing is a lifting surface, there will be both drag and lift components. Usually, however, with conventional aircraft, the slipstream is small as compared with the wing span; hence, the portion of the wing affected is small, but even so additional lift from the slipstream is commonly recognized and is computed, as shown in Warner's Airplane Design-Performance, page 585.

Considerable further experimental evidence illustrating the additional lift obtained from a propeller slipstream is reported in NACA Technical Memorandum No. 874, pages 3 and 15, and No. 920, on pages 1, 29–32 and 34. British experiments which also confirm this point are reported in publications of the Aeronautical Research Committee of the Air Ministry, for example Reports and Memoranda No. 1788.

Further, it has been shown that with very low aspect ratios of the order of 1.5 or less in rectangular wings induced drag is actually smaller than would be indicated by computation based on the lifting line theory with the usual correction factors. This actuality is supported by Technical Report No. 431 of the National Advisory Committee for Aeronautics, entitled "Characteristics of Clark Y Airfoils of Small Aspect Ratios," by C. H. Zimmerman in the statement on page 10, under the section "Reduction to infinite aspect ratio," which is based on experimental data shown in Figure 14. Experimental work carried out in Germany in 1936 leading to the same conclusion is reported in Technical Memorandum No. 798 of the National Advisory Committee for Aeronautics entitled "Flow Phenomena of Plates and Airfoils of Short Span," by H. Winter. In a paper correlating the work of H. Winter, entitled "A theory for rectangular wings of small aspect ratio," by William Bollay, published in the Journal of the Institute of the Aeronautical Sciences, vol. 4, No. 7, May 1937, this fact is explained. Dr. Bollay further shows that results corresponding to the experimental findings are predicted by a lifting surface theory which holds that lift is uniform across the span of a very low aspect ratio wing.

This is in contrast to a large aspect ratio wing in which, according to the lifting line theory, there is an elliptical lift distribution, with the sections near the wing tips providing relatively little lift. Warner, Airplane Design-Performance, on page 89, shows that induced drag for a wing will be a minimum when the downwash is uniform from tip to tip, and referring to large aspect ratio wings, that this requirement will be satisfied by an elliptic lift distribution. But Bollay shows that this required condition of uniform downwash across the span for minimum induced drag in the case of a low aspect ratio wing corresponds to a uniform lift distribution across the span. In this latter case then the entire wing including the tips are contributing their full share towards the lift, so that a low aspect ratio or a short span wing will have a lower induced drag, or a greater effective span in terms of the conventional lifting line theory, usually used as the basis for induced drag calculations.

My invention resides in the discovery of a practical short span aircraft based on these principles and so arranged as to maintain an airfoil of aspect ratio less than one, and preferably not exceeding one-half, at its optimum operating condition. This arrangement has been achieved by immersing the entire aircraft, which has a total span not exceeding the maximum width for highway travel, in the propeller slipstream. Thus, the invention accomplishes the main object of providing a practical, roadable aircraft of high utility. Further, as will be seen from the following general description, other desirable objects and advantages follow from the novel arrangement of this invention.

Essentially the invention is a flying wing aircraft of very low aspect ratio whose span does not exceed the maximum width for highway travel. Its wing section is of sufficient depth to allow the pilot and passenger to sit abreast within the leading edge and to allow housing its two engines of lightweight per horsepower with their accessories. Its control surfaces are mounted at the rear, and its two constant speed tractor propellers mounted at the leading edge wing tips and so placed as to immerse the entire aircraft in a slipstream of maximum velocity.

It will be seen that providing two tractor propellers of conventional diameter for maximum propulsive efficiency yet having combined diameters greater than the span of the wing ensures the entire aircraft's flying immersed in its own propeller slipstream, utilizing energy that would otherwise be wasted in the slipstream, and this arrangement, i. e., the high velocity airflow over the entire aircraft, reduces the otherwise high induced drag.

Further, operation of the propellers at or near the wing tips extends the slipstreams beyond the actual physical extent of the span and thus provides a further partial discontinuity beyond that offered by the wing itself. This fact, together with the effect of uniform lift distribution across the span in producing uniform downwash in the case of a low aspect ratio wing, as discussed earlier, combine to produce an increased effective span.

Direction of propeller rotation does not affect efficiency of the aircraft although their operation in opposite directions is desirable to neutralize torque and gyroscopic couples. Likewise, whether the tips of both propellers move up or down at the plane of symmetry of the machine will make no significant difference in flight efficiency. Consequently, any desired combination of direction of rotation may be employed for most satisfactory control characteristics in specific applications.

The exact span of the aircraft has the advantage not only of being within the allowable width for highway travel but is of a specific aspect ratio to benefit from the mutual interferences of the wing tip vortices in providing increased effective span. However, while the maximum utility of the invention is realized by a span not exceeding the width for highway travel, it should be made clear that it is adaptable to other situations where a small span is desirable although the exact limitations may be other than that for highways, as for use in small aircraft operating from naval carriers and other sea going vessels. In short, the span is variable as desired, the only limiting factor being that it is smaller, or not in excess of, the combined diameter of the two propellers.

A further advantage of the invention is that an aircraft of short span lends itself to landing in or taking off from restricted areas such as small fields or single lanes of a public highway. Similarly, its ability to descend along a steep glide path at a low rate of speed is an additional landing advantage for small areas. Both these factors produce the desirable object of eliminating large landing spaces necessary for conventional span aircraft.

A further advantage of the invention lies in avoiding protrudance which creates drag by having the pilot and passenger enclosure within the nose or leading edge of the wing, although this is not an essential feature and the enclosure may be made to protrude from and faired into the wing surface if desired in any specific application.

Further, the invention has a large safety feature since the aircraft, in containing two engines operating two constant speed propellers, has means whereby, in the event of failure of one engine, the other engine will drive both propellers for continuing flight.

The aircraft has the additional advantages of inherent longitudinal stability and absence of any tendency to autorotate, characteristic of rectangular airfoils of low aspect ratio.

Finally, the compact arrangement of the aircraft creates minimum parasite drag and provides the generally desirable objects of maximum structural efficiency and ease of construction.

All of the above features combine to produce a light aircraft of conventional flight characteristics but with exceptional performance, particularly high rate of climb at a high climbing speed, a high efficient cruising speed, and desirable landing characteristics. This performance, together with roadability, will offer transportation of high utility.

The features of my invention will be illustrated in the accompanying drawings and described in the following detailed specification, a certain preferred embodiment being disclosed by way of illustration only; for since the underlying principles may be incorporated in other specific devices, it is not intended to be limited by the one disclosed here except as any limitations are clearly imposed by the appended claims.

Figure 1:
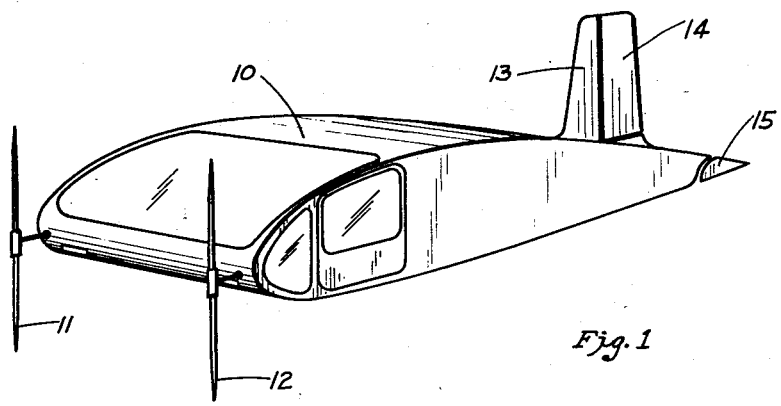
Figure 1 is an overall perspective view of a roadable aircraft in accordance with the present invention, showing the aircraft in normal flight.

Referring now in more detail to the drawings, and in particular to Figure 1, there is illustrated a flying wing type aircraft in accordance with the present invention comprising a main body or fuselage 10 of airfoil shape on which are mounted two tractor propellers 11 and 12 at the forward wing tips.

In one form the body of the aircraft is eight feet wide and twenty-four feet long, making the aspect ratio one-third, with the plane of the two propellers located one foot ahead of the wing leading edge, giving an overall length of approximately 25 feet. The airfoil section is NACA No. 104, which has a maximum thickness of twenty-one percent of the airfoil length, which in this case then is 5.04 feet. Two engines each of 125 horsepower are provided, each driving a propeller 6.5 feet in diameter. These two propellers are located with a six inch clearance between their tips, so that the total width between the extreme propeller tips is 13.5 feet.

The entire body of the aircraft forms a low aspect ratio airfoil of such dimensions that when in combination with the most efficient propeller dimensions and their location at the wing tips the entire aircraft is immersed in the propeller slipstreams and thereby induced drag is kept to a reasonable value at climbing and cruising speeds. While the embodiment illustrated herein has an aspect ratio of one-third, a slightly larger aspect ratio might be used, although it should preferably not exceed one-half.

Figure 4:
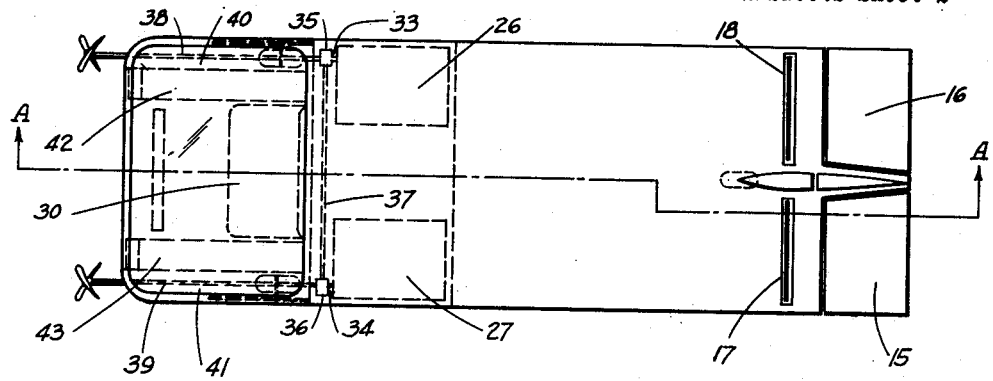
Figure 4 is a top plan view of the aircraft of Figure 1.

Stabilizing and control surfaces mounted on the fuselage include a vertical fin 13 for maintaining directional stability, a rudder 14 to provide directional control, and a pair of full span slotted trailing edge flaps 15 and 16 to give increased lift during landing. Only one of these flaps is shown in Figure 1 but both are shown in Figure 4. Also as shown in Figure 4, full span scoops 17 and 18 are installed just forward of the flaps, providing lateral control when operated in opposing directions with respect to the longitudinal axis. In addition, these scoops are operated together in the same direction and in conjunction with the flaps to provide longitudinal control.

Figure 6:
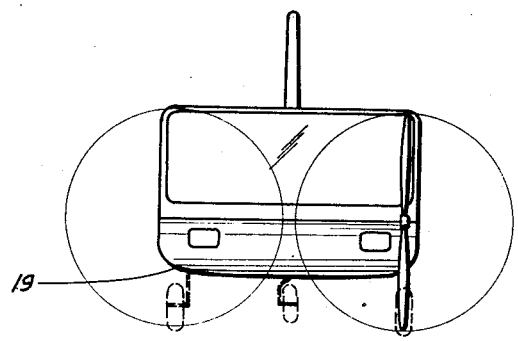
Figure 6 is a front elevation of the aircraft of Figure 1.

It will be noted particularly in Figures 1 and 6 that the bottom surface of the fuselage 10 is somewhat convex as indicated at 19, which acting in conjunction with the vertical fin 13, gives the aircraft inherent lateral stability. Longitudinal stability is inherent in rectangular airfoils of aspect ratio less than one (NACA TR No. 431) and hence no horizontal stabilizer is required.

Figure 2:
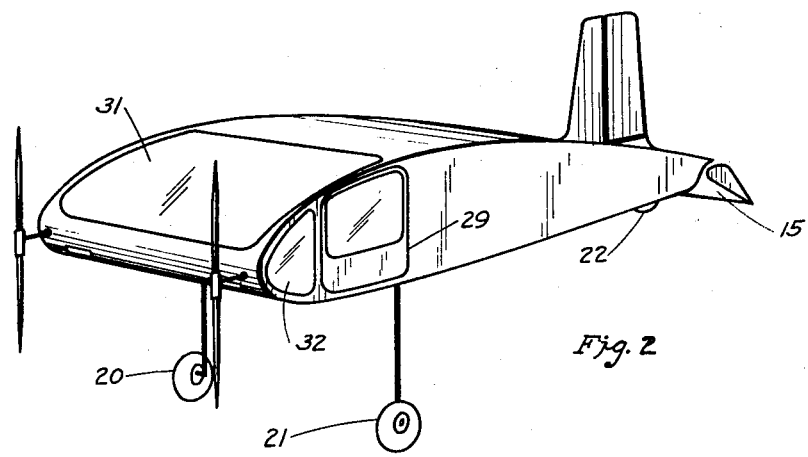
Figure 2 is a similar perspective view of the aircraft of Figure 1, showing the aircraft in the landing configuration.

As is shown in Figure 2, the retractable landing gear comprising the two forward wheels 20 and 21 and the rear wheel 22 extend and the two flaps 15 and 16 lower for the aircraft to assume the conventional landing configuration.

Figure 3:
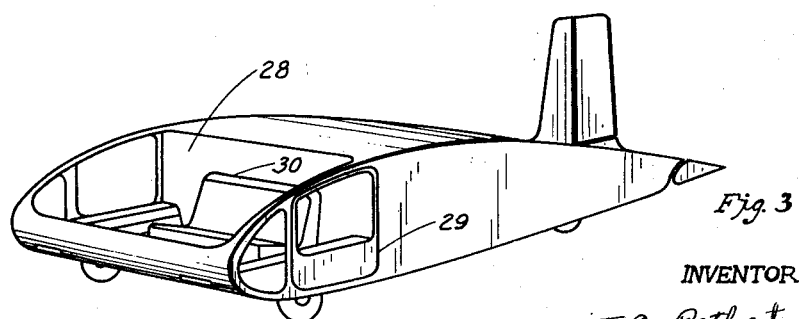
Figure 3 is a similar perspective view of the aircraft of Figure 1, showing the aircraft in the highway configuration.

For highway travel, the propellers may be stopped in the vertical position, or normally would be removed, as shown in Figure 3. In either case, the overall width of the aircraft is only eight feet, not exceeding the maximum width allowable for highway travel. For such highway operation, when the propellers are removed, they may be carried in the aircraft.

Figure 5:
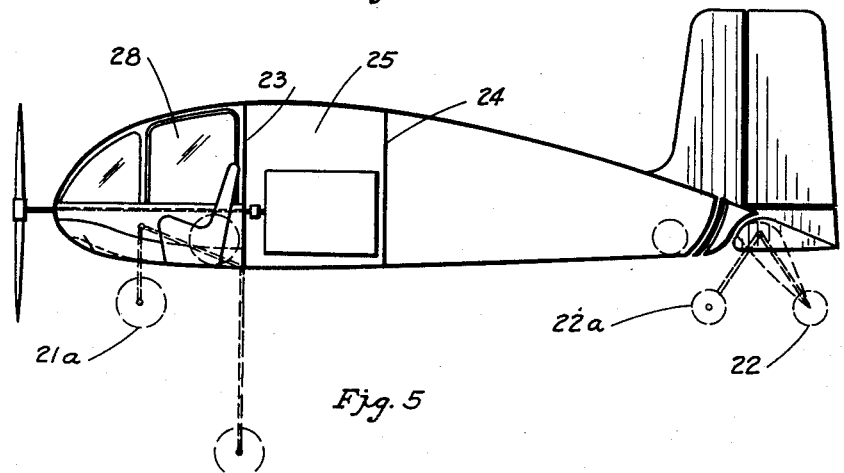
Figure 5 is a longitudinal section view of the aircraft taken along the line A—A of Figure 4.

Also, for this highway configuration, the forward landing gear partially folds up and forward in a manner best illustrated in Figure 5, to a position designated as 21a, which allows the aircraft body to ride level and close to the ground, which is desirable for highway operation. The center of gravity is conventionally located at a distance approximately 30% of the chord back from the leading edge of the airfoil, and coincides with the center of lift of the airfoil. When the aircraft is in the configuration shown in Figure 2, the forward wheels are only a short distance ahead of the center of gravity, as is customary in the design of all aircraft having this type of landing gear, so that approximately 90% of the weight of the aircraft is supported on the forward wheels, and only about 10% on the rear wheel. This condition of near-balance about the front wheels is necessary in order to minimize the load that must be lifted by the flaps 15, 16 and scoops 17, 18 when the trailing edge of the airfoil is raised on the take-off run. Such a nearly-balanced condition is entirely unsuited for highway travel, however, and the shifting of the forward wheels to the position 21a, further out ahead of the center of gravity of the aircraft, together with forward swinging of the rear wheel to position 22a, shown in Figure 5, results in a more equalized distribution of the load between the front and rear wheels; a condition prerequisite to good surface riding qualities. Thus, I provide means for quickly and easily changing the weight distribution of the aircraft from the condition of near-balance about the front wheels, which is necessary for take-off and landing, to a condition of relatively equalized wheel loading, which is essential to good highway riding qualities.

The wheels of the landing gear are constructed and arranged for steering during ground operation and road travel and suitable auxiliary means are provided for driving the wheels in either direction, but as these largely conventional features form no part of the present invention, they will not be described in further detail.

The interior arrangement of the aircraft is perhaps best illustrated in Figures 3, 4 and 5. As shown particularly in Figure 5 a relatively thick airfoil section (NACA No. 104, TR 391) is employed in order to provide adequate space to house both passengers and engines. The basic structure comprises a main box spar having vertical web portions 23 and 24 and constituting an engine compartment 25 wherein are located in the present embodiment two suitable engines of any conventional type designated by reference numerals 26 and 27 in Figure 4. The passenger enclosure 28, shown in Figure 5, is entirely located within a torque box integral with an extending forward of the forward web 23 of this box spar.

By this arrangement the major loads are concentrated near the center of gravity and the necessity for auxiliary firewalls is obviated. The noise in the passenger enclosure is also reduced by location of the engines rearward.

As shown in Figure 3, the leading edge portion of the fuselage 10 constitutes a pilot and passenger enclosure 28 provided with automobile type access doors 29 at either side thereof and a transversely extending seat 30.

The usual controls and instruments are provided in the pilot's compartment, but as these features may follow conventional practice they are not shown in the drawings or described in detail.

As shown in Figure 2, the upper portion of the leading edge 31 of the fuselage 10 as well as the forward side panels 32 and the upper portions of the access doors 29 substantially surrounding the pilot's compartment are constructed of a transparent material such as glass or Plexiglas. These sections may include if required a plurality of strengthening ribs (not shown) for withstanding aerodynamic forces.

As seen in Figure 4, the engines 26 and 27 mounted within the compartment 25 are connected by stub shafts 33 and 34 to overriding clutch mechanisms 35 and 36 so that in the event of failure an engine may disengage, and the other engine because of the cross connecting shaft 37 will drive both propellers 11 and 12.

The propeller shafts 38 and 39 run from the overriding clutch mechanisms 35 and 36 forward to the propellers 11 and 12 through compartments 40 and 41, which also house the forward landing gear and wheels when retracted, as shown in Figure 5. The air intake ducts 42 and 43 for engine cooling and carburation run from the leading edge aft to the engine compartment along the floor of the passenger compartment between the propeller shaft compartments 40 and 41 and the seat 30, as shown in Figures 4 and 5.

From the foregoing detailed description, it will be apparent that the present invention provides a flying wing aircraft of very low aspect ratio with two propellers of conventional diameter mounted at the forward wing tips whereby the entire aircraft operates in the propeller slipstreams. This high velocity flow of air, particularly over the upper surface of the air foil, has a low static pressure with respect to the air at a distance from the airfoil, in accordance with Bernoulli's equation. This low pressure induces a downward flow of the entire stream of air surrounding the air foil, in accordance with accepted airfoil theory, as graphically illustrated by the swept area concept, outlined in Warner, Airplane Design-Performance, page 89.

This arrangement, particularly at low flight speeds, is equivalent to an actual increase in wing span, since it results in increasing the total mass of air to which downward momentum is imparted by the lifting surface. For level flight and small rates of climb, the lift of the airfoil is equal to the momentum of the air accelerated downward, the momentum depending on the first power of the downward velocity, $L=MV$. The energy required by the airfoil for the acceleration of the air depends on the square of the downward velocity, since it exists principally in the form of kinetic energy, $K.E. = \frac{1}{2}MV^2$. It is consequently more efficient to sustain the weight of an aircraft through the momentum of a large mass of air $M$ and a small downward velocity $V$, corresponding to a large span immersed in a stream of high velocity air.

The practical effect of imparting downward momentum to an increased mass of air for a given span is equivalent to the operation of this span in the stream of high velocity air provided by the slipstream, and may be more readily analyzed on this basis. Since for a given weight the lift coefficient of an airfoil is inversely proportional to the square of the relative air velocity over the airfoil, the immersion of the aircraft in the high velocity slipstream allows the aircraft to fly at a low lift coefficient even at low aircraft flight velocities. Accordingly, since induced drag is not critical so long as an airfoil is operating at a low lift coefficient, and since aspect ratio is not of limiting effect so long as induced drag is not critical, the aircraft in accordance with the present invention performs satisfactorily in spite of its very low aspect ratio.

The derivation of the fundamental concepts previously set forth will be readily apparent to one skilled in the art from the following brief outline:

If $V_p$ is the flight velocity of the airplane, or the relative free stream airspeed of the unaccelerated air, and $V_w$ is the velocity of air by the lifting surface, then in a conventional airplane having no provisions for accelerating the air velocity by the wing surface, $$V_w = V_p \quad \text{(conventional airplane)} \quad (1)$$

But in an airplane having provisions for accelerating the air velocity over the wing surface by immersion of the aircraft in the propeller slipstream, $$V_w = \text{slipstream velocity} = V_s = kV_p$$
$$\text{(airplane immersed in slipstream)} \quad (2)$$

where the factor $k$ is defined as representing the ratio $V_w/V_p$, and is commonly called the velocity ratio.

In the case of a conventional airplane, the lift, $L$, may be expressed as:

$$L = C_{L(v-p)} \rho/2 S V_p^2 \quad (3)$$

where the lift coefficient, $C_L$, is determined by the airplane velocity, $V_p$.

In the case of an airplane immersed in the propeller slipstream, $$L = C_{L(v-w)}\rho/2SV_w^2 = C_{L(v-w)}\rho/2S(kV_p)^2 \quad (4)$$

For a given gross weight Equations 3 and 4 are equal, and for equal wing areas and airplane velocities $$C_{L(v-w)} = \frac{1}{k^2} C_{L(v-p)} \quad (5)$$

This means that in a case where the airplane is immersed in a propeller slipstream greater than the airplane velocity, the airplane will fly at a lift coefficient equal to the lift coefficient at which the airplane would fly if it were not in the propeller slipstream, divided by the square of the velocity ratio.

Further, the lift coefficient is related to the induced drag coefficient, $C_{D_i}$, by the following expression:

$$C_{D_i} = \frac{C_L^2}{\pi AR} \quad (6)$$

(Warner, Airplane Design-Performance, page 92)

In this relation the value of $C_L$ is that at which the airplane is flying, or $C_{L(v-w)}$.

Using this value for the lift coefficient, and substituting (5) above in (6), it follows that:

$$C_{D_i}=\frac{C_{L(v-w)}^2}{\pi AR}=\frac{\left[\frac{1}{k^2}C_{L(v-p)}\right]^2}{\pi AR}=\frac{C_{L(v-p)}^2}{\pi AR k^4} \quad (7)$$

The induced drag itself, $D_i$, is related to the induced drag coefficient by the following expression, where again the velocity term is the velocity of air flow by the wing. Thus:

$$D_i = C_{D_i} \rho/2 S V_w^2 \quad (8)$$

Substituting (7)

$$D_i = \frac{C_{L(v-p)}^2}{\pi AR k^4} \rho/2 S V_w^2$$

To convert this equation into terms of flight velocity, $V_p$, the value of $k$ from (2) above is substituted $$D_i = \frac{C_{L(v-p)}^2}{\pi AR} \frac{V_p^4}{V_w^4} \rho/2 S V_w^2$$

Dividing top and bottom by $V_w^2$, and separating $V_p^4$ $$D_i = \frac{C_{L(v-p)}^2}{\pi AR} \frac{V_p^2 V_p^2}{V_w^2} \rho/2 S$$

Converting back into terms of velocity ratio $k$ $$D_i = \frac{C_{L(v-p)}^2}{\pi AR k^2} \rho/2 S V_p^2 \quad (9)$$

This relationship as set forth in Equation 9 is reduced to terms of flight velocity in accordance with usual practice. The expression clearly shows that while induced drag varies inversely as the aspect ratio, it also varies inversely as the square of the velocity ratio, and thus, for a given induced drag, the effect of aspect ratio varies inversely as the square of the velocity ratio. In accordance with the present invention a velocity ratio immersing the aircraft is provided in the form of the propeller slipstream which automatically increases at low flight speeds, and lowers the ratio of induced to total drag which normally would be expected with wings of extremely low aspect ratio. Thus the provision of a stream of high velocity airflow completely immersing the airfoil provides an effective way of flying at all times at a low lift coefficient, thereby keeping induced drag to reasonable values.

While a preferred form and method of employing the invention have been disclosed in detail, it is to be understood that the invention lends itself to numerous variations without departing from the basic principles or the scope of the appended claims.

Having thus described my invention, what I claim as novel and desire to secure by Letters Patent of the United States is:

1. A roadable aircraft capable of flying in the air or traveling on the highway under its own power without structural modification; said aircraft having an engine and being provided with wheels that can be connected to said engine to be driven thereby, said aircraft being further provided with wheels that can be steered, and with tractor propeller means disconnectable from said engine for highway travel, and a lifting fuselage of airfoil shape, said fuselage being of relatively short span and low aspect ratio, whereby the aircraft is kept within the maximum legal width for highway travel while at the same time providing sufficient headroom within the fuselage to accommodate seated passengers, said tractor propeller means being so disposed and proportioned that substantially the entire air-foil-shaped fuselage is immersed in the high velocity slip stream thereof, the immersion of said fuselage in said slip stream acting to reduce the otherwise excessive induced drag at low speeds inherent in the low aspect ratio airfoil, and enabling the aircraft to fly at a low lift coefficient at low aircraft flight velocities.

2. A roadable aircraft capable of flying in the air or traveling on the highway under its own power without structural modification; said aircraft having an engine and being provided with wheels that can be connected to said engine to be driven thereby, said aircraft being further provided with wheels that can be steered, a lifting fuselage of airfoil shape, said fuselage being of relatively short span and low aspect ratio, whereby the aircraft is kept within the maximum legal width for highway travel while at the same time providing sufficient headroom within the fuselage to accommodate seated passengers, and a pair of laterally spaced tractor propellers disposed and proportioned so that substantially the entire air-foil-shaped fuselage is immersed in the high velocity slip stream thereof, said propellers being disconnectable from said engine for highway travel, the immersion of said fuselage in said slip stream acting to reduce the otherwise excessive induced drag at low speeds inherent in the low aspect ratio airfoil, and enabling the aircraft to fly at a low lift coefficient at low aircraft flight velocities.

3. A roadable aircraft capable of flying in the air or traveling on the highway under its own power without structural modification, said aircraft having an engine and being provided with wheels that can be connected to said engine to be driven thereby, said aircraft being further provided with wheels that can be steered, a lifting fuselage of airfoil shape, said fuselage being of relatively short span and low aspect ratio, whereby the aircraft is kept within the maximum legal width for highway travel while at the same time providing sufficient headroom within the fuselage to accommodate seated passengers, and a pair of laterally spaced tractor propellers positioned at the tips of said airfoil shaped fuselage, each of said propllers being of a radius only slightly smaller than the distance from the axis of rotation thereof to the centerline of the aircraft, whereby substantially the entire fuselage is immersed in the slip stream of the propellers, said propellers being disconnectable from said engine for highway travel, the immersion of said fuselage in said slip stream acting to reduce the otherwise excessive induced drag at low speeds inherent in the low aspect ratio airfoil, and enabling the aircraft to fly at a low lift coefficient at low aircraft flight velocities.

4. A roadable aircraft capable of flying in the air or traveling on the highway under its own power without structural modification, said aircraft having an engine and being provided with wheels that can be connected to said engine to be driven thereby, said aircraft being further provided with wheels that can be steered, a lifting fuselage of airfoil section, said fuselage having a span not exceeding eight feet and an aspect ratio not exceeding one-half, whereby the aircraft is kept within the maximum legal width for highway travel while at the same time providing sufficient headroom within the fuselage to accommodate seated passengers, and tractor propeller means disposed and proportioned so that substantially the entire air-foil-shaped fuselage is immersed in the high velocity slip stream thereof, said propeller means being disconnectable from said engine for highway travel, the immersion of said fuselage in said slip stream acting to reduce the otherwise excessive induced drag at low speeds inherent in the low aspect ratio airfoil, and enabling the aircraft to fly at a low lift coefficient at low aircraft flight velocities.

5. A roadable aircraft capable of flying in the air or traveling on the highway under its own power without structural modification, said aircraft having an engine, a pair of laterally spaced front wheels, and at least one rear wheel, certain of said wheels being connectable with said engine to be driven thereby, and certain of said wheels being steerable, said front wheels being movable to an extended landing position spaced a short distance ahead of the center of gravity of the aircraft, whereby a substantially greater portion of the weight of the aircraft is borne on the front wheels than is borne by the rear wheel, or to an alternative highway position considerably ahead of said first-named position, whereby a more equalized distribution of the load on the wheels is obtained for improved riding qualities on the highway.

6. A roadable aircraft capable of flying in the air or traveling on the highway under its own power without structural modification, said aircraft having an engine, a pair of laterally spaced front wheels, and at least one rear wheel, certain of said wheels being connectable with said engine to be driven thereby, and certain of said wheels being steerable, said front wheels being movable to an extended landing position spaced a short distance ahead of the center of gravity of the aircraft, whereby a substantially greater portion of the weight of the aircraft is borne on the front wheels than is borne by the rear wheel, or to an alternative highway position considerably ahead of said first-named position, and said rear wheel being movable from a rearward landing position to a forward highway position, the forward shifting of both said front and rear wheels with respect to the center of gravity of the airplane resulting in a more equalized distribution of the load on the wheels for improved riding qualities on the highway.

7. A roadable aircraft capable of flying in the air or traveling on the highway under its own power without structural modification, said aircraft comprising a lifting fuselage of airfoil shape, said fuselage being of relatively short span and low aspect ratio, whereby the aircraft is kept within the maximum legal width for highway travel while at the same time providing sufficient headroom within the fuselage to accommodate seated passengers, an engine, a pair of laterally spaced tractor propellers disposed and proportioned so that substantially the entire air-foil-shaped fuselage is immersed in the high velocity slip stream thereof, said propellers being disconnectable from said engine for highway travel, the immersion of said fuselage in said slip stream acting to reduce the otherwise excessive induced drag at low speeds inherent in the low aspect ratio airfoil, and enabling the aircraft to fly at a low lift coefficient at low aircraft flight velocities, a pair of laterally spaced front wheels, and at least one rear wheel, certain of said wheels being connectable with said engine to be driven thereby, and certain of said wheels being steerable, said front wheels being movable to an extended landing position spaced a short distance ahead of the center of gravity of the aircraft, whereby a substantially greater portion of the weight is borne on the front wheels than is borne by the rear wheel, or to an alternative highway position considerably ahead of said first-named position, and said rear wheel being movable from a rearward landing position to a forward highway position, the forward shifting of both said front and rear wheels with respect to the center of gravity of the airplane resulting in a more equalized distribution of the load on the wheels for improved riding qualities on the highway.

SCOTT C. RETHORST.

REFERENCES CITED

The following references are of record in the file of this patent:

UNITED STATES PATENTS

| Number | Name | Date |
|---|---|---|
| 1,761,053 | Rystedt | June 3, 1930 |
| 1,795,970 | Rohrbach | Mar. 10, 1931 |
| 1,980,246 | Austin | Nov. 13, 1934 |
| 2,108,093 | Zimmerman | Feb. 15, 1938 |
| 2,181,574 | Burnelli | Nov. 28, 1939 |
| 2,182,333 | Cowey | Dec. 5, 1939 |
| 2,294,367 | Fleming | Sept. 1, 1942 |
| 2,402,118 | Ashkenas | June 18, 1946 |
| 2,431,293 | Zimmerman | Nov. 18, 1947 |
| 2,446,480 | Leonard | Aug. 3, 1948 |

FOREIGN PATENTS

| Number | Country | Date |
|---|---|---|
| 100,274 | Austria | June 25, 1925 |
| 367,036 | Germany | Jan. 16, 1923 |